(12) United States Patent
Sarda et al.

(10) Patent No.: US 10,609,028 B2
(45) Date of Patent: Mar. 31, 2020

(54) SECURING DIGITAL DATA TRANSMISSION IN A COMMUNICATION NETWORK

(71) Applicant: Nagravision S.A., Cheseaux-sur Lausanne (CH)

(72) Inventors: Pierre Sarda, Echallens (CH); Didier Hunacek, Blonay (CH); John Tinsman, Santa Cruz, CA (US); Philippe Stransky-Heilkron, Cheseaux-sur Lausanne (CH)

(73) Assignee: Nagravision S.A., Chesaux-sur-Lausanne (CH)

( * ) Notice: Subject to any disclaimer, the term of this patent is extended or adjusted under 35 U.S.C. 154(b) by 310 days.

(21) Appl. No.: 15/838,972

(22) Filed: Dec. 12, 2017

(65) Prior Publication Data

US 2019/0182244 A1 Jun. 13, 2019

(51) Int. Cl.
*H04L 29/06* (2006.01)
*H04N 21/8358* (2011.01)
(Continued)

(52) U.S. Cl.
CPC .......... *H04L 63/0876* (2013.01); *G06F 21/44* (2013.01); *H04L 9/0866* (2013.01); *H04L 9/321* (2013.01); *H04L 63/0428* (2013.01); *H04L 63/06* (2013.01); *H04N 7/181* (2013.01); *H04N 21/42684* (2013.01); *H04N 21/835* (2013.01); *H04N 21/8358* (2013.01)

(58) Field of Classification Search
CPC ............. H04L 63/0876; H04L 63/0428; H04L 9/0866; H04L 9/321; H04L 63/06; H04N 21/42684; H04N 7/181; H04N 21/835; H04N 21/8358; G06F 21/44
See application file for complete search history.

(56) References Cited

U.S. PATENT DOCUMENTS

| 2004/0071311 A1* | 4/2004 | Choi | G06T 1/0071 |
| | | | 382/100 |
| 2007/0003102 A1* | 1/2007 | Fujii | G06T 1/0071 |
| | | | 382/100 |

(Continued)

OTHER PUBLICATIONS

International Search Report and Written Opinion of International Searching Authority dated Mar. 21, 2019, issued in International Application No. PCT/US2018/064472.

*Primary Examiner* — Chau Le
(74) *Attorney, Agent, or Firm* — Oblon, McClelland, Maier & Neustadt, L.L.P.

(57) ABSTRACT

A method for securing transmission of digital data in a communication network comprising a central station or a terminal and at least one device monitored by the central station via the communication network. The at least one device is configured to produce and to transmit a digital data stream to the central station or terminal. The at least one device further comprises a secure non-volatile memory for storing at least device specific information. The at least one device forms a data block based on at least the device specific information stored in the secure memory. The data block thus formed may compose additional data to be merged with the digital data stream produced by the at least one device. A modified digital data stream results from this merging operation and is transmitted by the at least one device to the central station or terminal.

14 Claims, 2 Drawing Sheets

(51) Int. Cl.
    *H04L 9/32*           (2006.01)
    *H04L 9/08*           (2006.01)
    *G06F 21/44*         (2013.01)
    *H04N 21/835*       (2011.01)
    *H04N 7/18*           (2006.01)
    *H04N 21/426*       (2011.01)

(56) References Cited

U.S. PATENT DOCUMENTS

| | | | |
|---|---|---|---|
| 2010/0317399 A1* | 12/2010 | Rodriguez | H04M 1/0272 455/556.1 |
| 2015/0149297 A1* | 5/2015 | Mahadevan | H04W 4/21 705/14.66 |
| 2015/0381943 A1* | 12/2015 | Renkis | H04N 7/181 348/159 |
| 2016/0335476 A1* | 11/2016 | Renkis | H04N 7/181 |
| 2019/0182244 A1* | 6/2019 | Sarda | H04N 7/181 |

* cited by examiner

SECURING DIGITAL DATA TRANSMISSION IN A COMMUNICATION NETWORK

INTRODUCTION

The present disclosure generally relates to IoT devices producing digital data streams in a communication network. In particular, a solution for securing digital data transmission in the communication network is disclosed.

TECHNICAL BACKGROUND

The Internet is a global system of interconnected computers and computer networks that use a standard Internet protocol as for example the Transmission Control Protocol (TCP) and Internet Protocol (IP) to communicate with each other. The Internet of Things (IoT) is based on the idea that everyday objects, not just computers and computer networks, can be readable, recognizable, locatable, addressable, and controllable via an IoT communications network as for example an ad-hoc network or the Internet.

There are a number of key applications for the IoT. For example, in the field of smart grids and energy management, utility companies can optimize delivery of energy to homes and businesses while customers can better manage energy usage. In the field of home and building automation, smart homes and buildings can have centralized control over virtually any device or system in the home or office, from appliances to plug-in electric vehicle security systems. In the field of asset tracking, enterprises, hospitals, factories, and other large organizations can accurately track the locations of high-value equipment, patients, vehicles, and so on. In the area of health and wellness, doctors can remotely monitor health of patients while people can track the progress of fitness routines. As such, in the near future, increasing development in IoT technologies will lead to numerous IoT devices surrounding a user at home, in vehicles, at work, and many other locations. IoT capable devices can provide substantial real-time information about the environment of the user (e.g., likes, choices, habits, device conditions and usage patterns, images of location area, data from various environmental sensors associated with the IoT devices, energy consumption data, etc.).

In a further IoT devices application field, as for example cameras taking images from an area to be monitored generate image content without any solution to ensure integrity of the images. In particular, when the images are transmitted to a monitoring central station or terminal via a communication network such as internet, some kind of protection is needed. The images may be used for live monitoring or temporary storage for later use by the central station or terminal. There is an issue regarding information to indicate in a secure way at least which camera has generated and transmitted the images. In addition to a specific identifier of the cameras, further information such as camera location area or position coordinates, current date and time may be necessary to ensure authenticity of the images. This information would guaranty that the images have not been modified or a camera substituted by another one.

SUMMARY

In order to provide solutions to the above-mentioned issues, embodiments of the present disclosure propose a method for securing transmission of digital data in a communication network. The communication network generally comprises a central station or a terminal and at least one device monitored by the central station via the communication network. The at least one device is configured to produce and to transmit a digital data stream to the central station or terminal. The at least one device further comprises a secure non-volatile memory for storing at least device specific information data. The at least one device forms a data block based on at least the device specific information data stored in the secure memory. The data block thus formed may compose additional data to be merged with the digital data stream produced by the at least one device. A modified digital data stream results from this merging operation and is transmitted by the at least one device to the central station or terminal.

The method may be performed on a network comprising a central station monitoring only one device as well as on a network where the central station monitors two or more devices.

According to an embodiment, the central station monitors at least one first and second device via the network, the at least one first and second device being configured to communicate with each other. The device specific information data of the first device is provided to the second device and the device specific information data of the second device is provided to the first device. The at least one first and second device each store the device specific information data of the first and second device in the secure non-volatile memory.

The additional data based on the data block is thus different for each device thanks to the incorporated device specific information data. Therefore, the central station or terminal receives a modified digital data stream specific to each device belonging to the communication network.

According to the method, the device specific information data of the first device is provided to the second device and vice-versa so that each device stores these specific identifiers in the secure memory.

In a general way, each device's memory stores the device specific information data of the device in question and the device specific information data of the other device belonging to a particular network.

DETAILED DESCRIPTION

Figure 1:
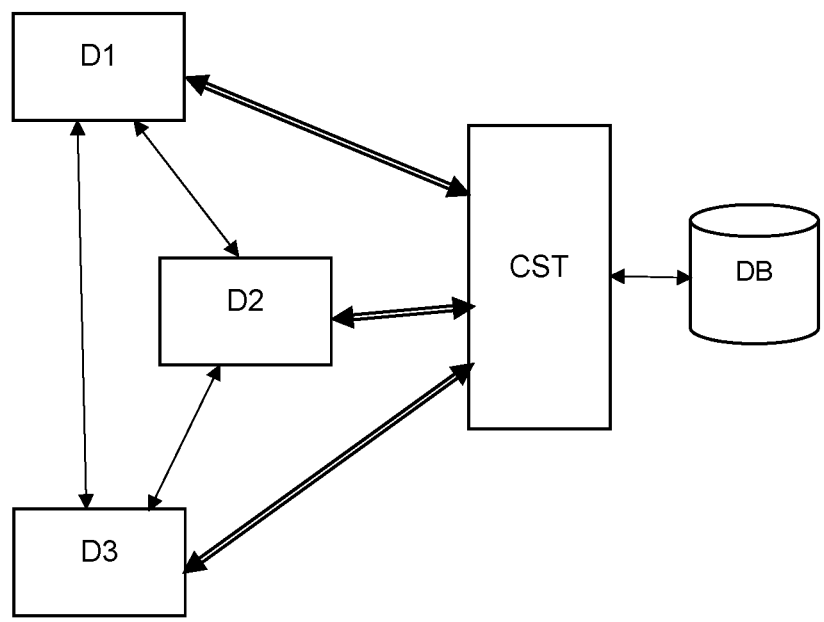
FIG. 1 shows a communication network comprising devices monitored by a central station and communicating with each other, each device producing a digital data stream to be transmitted towards the central station.

According to an embodiment illustrated by FIG. 1, several devices D1, D2, D3 . . . are monitored by a central station CST associated with a database DB. The devices D1, D2, D3 . . . communicate with the central station CST via a secure communication network and with each other. According to an embodiment, a first device D1 may communicate with a second device D2 that communicates with a third device D3 that finally communicates with the first device D1. In general terms, the devices may communicate with each other in a mesh network mode via a secure channel.

Figure 2:
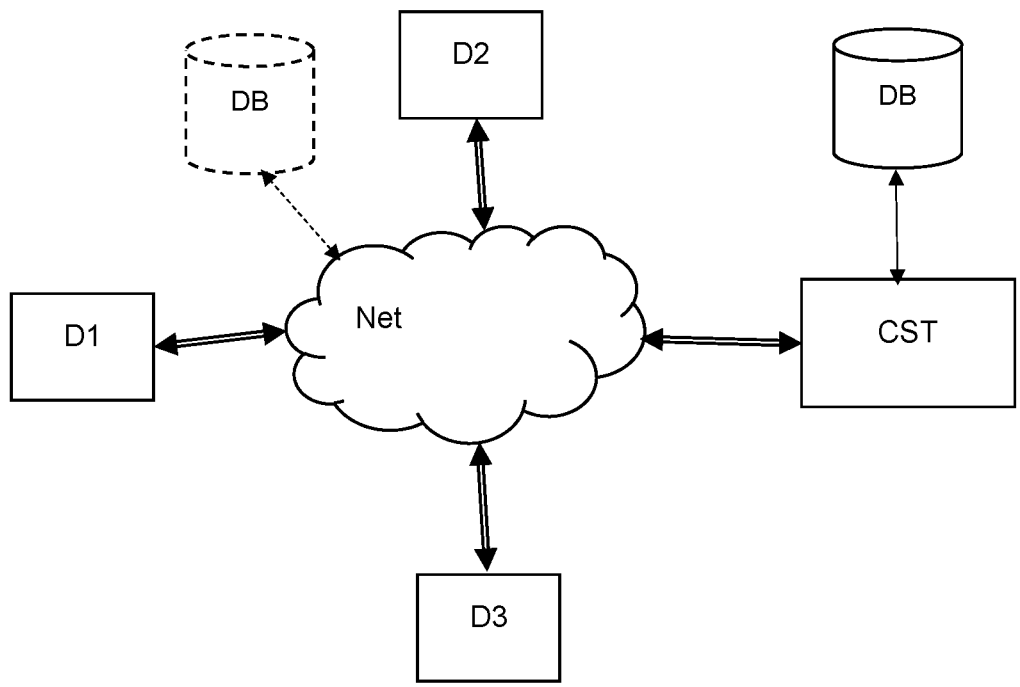
FIG. 2 shows the devices and the central station of FIG. 1 communicating via a global network such as Internet or a cloud system.

According to a further embodiment, the devices D1, D2, D3 . . . may securely communicate with each other via the central station CST in a star shaped network mode. Each device is linked to the central station which exchanges data with the devices in a secure way. In an exemplary configuration as shown by FIG. 2, the devices may communicate with the central station CST via internet. The database DB may be associated locally with the central station CST or remotely via a secured connection to internet as shown with dotted lines in FIG. 2.

A secure transmission channel may be established between two devices, a device and the central station CST and the database DB according to known methods using a common secret shared by the devices or methods using public and private encryption keys exchange protocols. The devices may comprise a non-volatile secure memory containing unique and secured device specific information data. The secure device specific information data may comprise a unique identifier specific to the device and other data as for example secret to be shared on the network and/or encryption keys for establishing secure links with other devices, the central station CST and the database DB.

The central station CST monitoring the secure communication network may store reference data related to each device connected to the communication network in the database DB. The central station further analyzes and processes data produced by the devices.

In an initialization phase of the secure communication network, preparation steps may be performed for securing data exchanges between the devices and the central station and between the devices themselves, namely:

When the devices comprise already device specific information data such as a unique identifier stored in the secure non-volatile memory at manufacturing of the device, the identifier may be transmitted to the central station CST for registering into the database DB associated with said central station CST. Each device may then transmit this unique identifier to another device or the central station CST transmits the registered identifiers to the devices.

The devices may generate a unique identifier at connection to the secure communication network, based on unique device specific information data as for example a unique identifier of the device or a device Media Access Control (MAC) address or an identifier of a chip integrated in the device or a combination thereof. The generated identifier is then stored in the secure non-volatile memory of each device and transmitted to the central station CST as in the preceding embodiment.

When the devices do not comprise device specific information data such as a unique identifier, the central station CST may attribute a unique identifier to each device of the secure communication network. The unique identifier can be randomly generated by the central station CST or the database DB. This identifier is then stored in the secure non-volatile memory of the device together with the identifiers of the other devices that are provided by the central station CST.

The network may comprise only devices having already a unique identifier or only devices without pre-stored identifier or a combination thereof. The central station CST may interrogate each device for acquiring the identifiers or for attributing an identifier to the devices without identifier.

The unique identifier of one or more devices on the network may be updated or one or more devices may be removed or added to the network monitored by the central station CST. In this case, the central station may transmit to each device connected to the network an updated list of unique identifiers. According to an embodiment, one or more updated identifiers may be pushed into the network in an analogous way than a virus which infects each connected device. The one or more updated identifiers are thus known by each device by propagation initiated by the central station CST and stored in the secure non-volatile memory of each device.

After the initialization phase, each device of the network stores in the secure non-volatile memory the identifier of all other devices in addition to its own identifier.

A preferred application example discussed hereafter relates to devices in form of monitoring cameras each producing a video stream to be processed by the central station. The cameras are configured to transmit the produced video stream to the central station and to communicate with each other either directly via a data link or via the central station through the link used for transmitting the video stream.

The cameras further comprise a secure memory for storing at least a unique specific identifier and the identifiers of the other cameras. Each camera is configured to generate a data block based on the stored identifiers and to merge with the video stream produced by the camera additional data comprising the data block. The additional data may form a watermark comprising at least the specific identifier of the camera and the data block. Each camera thus outputs and transmits via the secure communication network a watermarked video stream to the central station.

Figure 3:
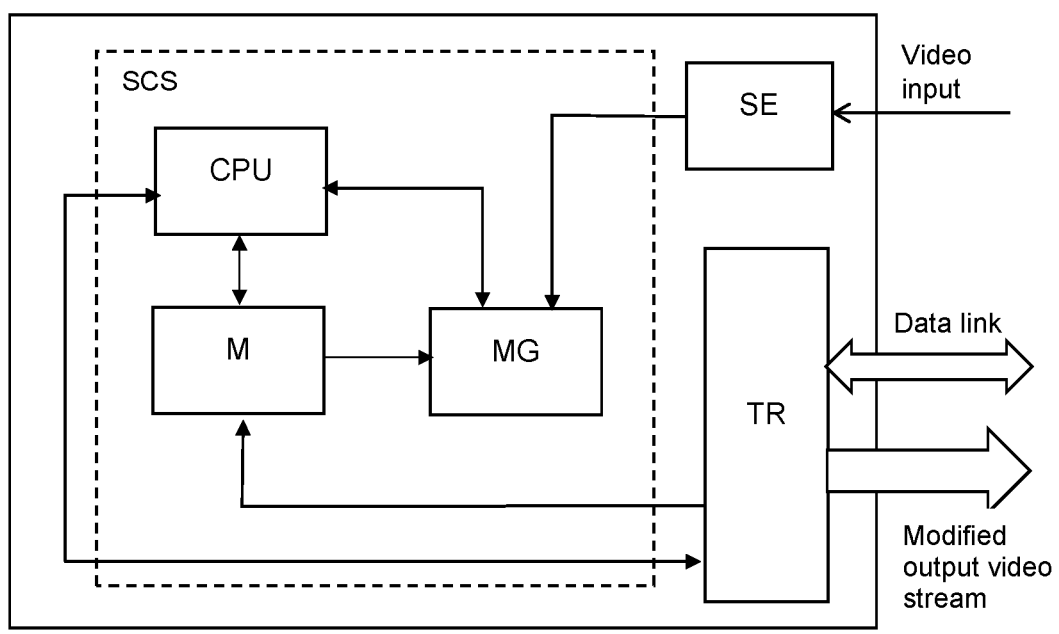
FIG. 3 shows a block schematic of a device including processing modules configured to secure the digital data stream produced by the device and the data link allowing communication with other devices of the communication network.

FIG. 3 shows a block schematic of a device according to the present disclosure such as a camera comprising a processor CPU associated with a memory M, a video sensor SE, a communication module TR and a merging module MG. The processor CPU, the memory M and the merging module MG may be regrouped in a secure chipset SCS.

The video sensor SE including a Charge-Coupled Device (CCD) or a Complementary Metal Oxide Semiconductor (CMOS) image sensor produces video data to be processed by the processor CPU. The communication module TR may be configured to exchange data with the central station as well as with other cameras on the secure network and to transmit processed video data in form of a modified video stream.

The processor CPU instructs the merging module MG for preparing and inserting additional data into the video data received from the video sensor SE according to a predetermined software program stored in the memory M. The software program is further configured to retrieve from the memory, generate, manage and transform various data to be used as additional data before insertion into the video data. The video data modified by the merging module MG with the additional data is then forwarded to the communication module TR for transmission to the central station CST.

The merging module MG modifies the produced video data comprising displayable frames to be displayed as images on a screen at the central station by inserting the additional data into at least some of the displayable frames. The additional data form a watermark that may be visible or not by human eyes. The images may include as watermark for example some visible pixels or any kind of mark preferably in a non-significative part of the image such as along the edges or in the corners.

The watermark is used by the central station for verifying:
network integrity in order to check if all cameras are present and able to operate, device authenticity in order to determine if each camera is identified by the central station to prevent any malicious camera replacement on the network, authenticity of video data produced by the camera in order to determine if the image received by the central station correspond to the images effectively captured by the camera.

The data block forming the watermark may comprise in addition to the identifiers of the cameras belonging to the network, a network address, a network identifier, a position indicator or coordinates of the camera, a time stamp, etc. or any combination thereof.

According to an embodiment, a mathematical function may be applied by each camera over the identifiers of all other cameras of the network stored in the secure memory. The data block is then formed by the obtained result instead of the identifiers themselves. This mathematical function may be for example a unidirectional collision free hash function known also by the central station so that the data block can be recalculated by the central station for verification. The watermark therefore comprises a global hash calculated by each camera on all or part of the identifiers of the cameras belonging to the network.

A watermark analyzer of the central station may extract the watermark from the video streams received from each camera for analyzing and comparing the received global hashes with a hash calculated over the identifiers stored in the database DB associated with the central station. If the received global hashes match with the calculated hash, the network is considered, by the central station, as conform with all cameras present and operating. In case of mismatch, an alarm can be raised.

When the watermark, respectively the data block, contains, in addition to the global hash, additional data such as network addresses or position coordinates of the cameras, the central station may check conformity of this additional data by comparing the data extracted from the watermark with corresponding data retrieved from the database DB by using the identifiers of the cameras.

The watermark may change periodically and the corresponding reference data in the database DB updated consequently by the central station. The central station may attribute periodically random identifiers to each camera, which calculates corresponding global hash before watermarking the produced video stream.

The central station CST may also monitor the cameras in the secure network by checking if updates of the data stored in the database DB are necessary or not. For example, the central station may periodically interrogate each camera for checking presence in the non-volatile memory of the identifiers of the other cameras belonging to the secure communication network.

In order to verify authenticity of the images, the watermark may further contain authentication data comprising a time code or a sequence number and a corresponding image signature based on a sequence or a group of consecutive frames produced by a camera. For example, at a predefined time a sequence of frames having a certain length may be encoded to form a fingerprint which may be encrypted with a key known by the central station. The time code or sequence number may be preferably unpredictable in order to prevent malicious replay of the sequence and fingerprint re-calculation. The time code or sequence number may be cryptographically transformed or associated with a pseudo-random number that is generated by using a known initial value at a known time.

This encrypted fingerprint forms a signature which can be decrypted by the central station for checking authenticity of the images received from a predefined camera. These images are thus verified as having been transmitted by a specific camera only, without having been modified by a third party connected to the network. The fingerprint may also be formed by a hash calculated over data representing a predetermined sequence of frames.

The watermark may further contain a reference fingerprint calculated on one or more individual frames or on a complete sequence of frames showing known images. The database DB may store these reference fingerprints based on typical images captured by each camera depending on the area where the camera is located. The verification of the watermark may be performed by using this reference fingerprint. In fact, a watermark analyzer of the central station carries out a search of a given reference fingerprint corresponding to a particular camera in the received video stream. When the reference fingerprint has been found and matches with the one retrieved from the database DB, the watermark analyzer may extract additional data such as identifiers, time stamps, signatures used for verification and validating authenticity of the received video stream. The authentication data may be also used for defining position of a visible watermark in the image.

The verification of a sequence of frames serves to determine if the sequence corresponds to the images effectively captured by a camera without having been manipulated by addition, deletion or substitution of frames.

The watermark based on images authentication data may be periodically renewed by changing parameters such as time code, sequence number or sequence duration or digest coding algorithm.

According to a further embodiment the watermark may be invisible by human eyes but machine readable. A technology based on encoding video data blocks of the displayable frames with the additional data by applying a predetermined watermarking algorithm may be used. Only a computer based image analyzer will thus be able to localize, extract and read the watermark in a sequence of images. The image analyzer knowing the watermarking algorithm used for encoding the video data blocks and being able to identify the encoded video data blocks can determine the watermark representing the additional data. Depending on the type of watermarking algorithm, the watermark may be determined by comparing video data of the images sequence with video data of a reference images sequence without watermark.

A further verification may be performed by the cameras to ensure that the central station or a terminal used as central station is authentic and not a fake terminal substituting the central station or terminal. This verification may be based on exchanges of messages containing an authentication code in form of a signature specific to the central station and not reproducible by any other device. For example, an identifier of the central station stored in the secure memory of each camera and encrypted by a key common to the cameras and the central station may be exchanged before video data processing.

In case of a large network with a set of a high number of cameras, the size of the data block forming the watermark increases proportionally so that the verification by the watermark analyzer is unnecessarily slowed down. The authentication messages exchanged between the cameras and the central station also becoming numerous may cause issues related to decrease of data throughput and transmission speed. To solve these potential issues, the watermark may be applied only on particular groups of frames instead on all frames produced by the cameras.

The set of a high number of cameras may be divided into subsets of smaller number of cameras. In this case the watermark may be based only on the identifiers of the cameras belonging to the subset and on an identifier specific to the subset. For example, a set of 100 cameras may be divided into 10 subsets of 10 cameras where each subset may have an identifier depending on the location of the subset. The watermark may thus be based on the 10 identifiers of the cameras belonging to the subset and an identifier of the subset or a hash calculated over these identifiers.

Although embodiments of the present disclosure have been described with reference to specific example embodiments, it will be evident that various modifications and changes may be made to these embodiments without departing from the broader scope of these embodiments. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived there from, such that structural and logical substitutions and changes may be made without departing from the scope of this disclosure. The detailed description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "disclosure" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The invention claimed is:

1. A method for securing transmission of digital data in a communication network, the network comprising a central station and at least one device monitored by the central station via the network, the at least one device being configured to produce and to transmit a digital data stream to the central station, the method comprising:
receiving information specific to the at least one device, and storing said information into a secure non-volatile memory of the at least one device;
forming by the at least one device a data block based on at least the device specific information stored in the secure non-volatile memory;
merging by the at least one device additional data with the digital data stream produced by said device, the additional data comprising at least the previously formed data block, obtaining a modified digital data stream; and
transmitting by the at least one device the modified digital data stream to the central station.

2. The method according to claim 1, wherein the central station monitors at least one first and second device via the network, the at least one first and second device being configured to communicate with each other.

3. The method according to claim 2, wherein the device specific information of the first device is provided to the second device and the device specific information of the second device is provided to the first device, the at least one first and second device each storing the device specific information of the first and second device in the secure non-volatile memory.

4. The method according to claim 2 wherein each device receives, in a network setup phase, device specific information from all the other devices belonging to the network.

5. The method according to claim 1, wherein the device specific information comprises a unique identifier of the device or a device Media Access Control (MAC) address or an identifier of a chip integrated in the device or a combination thereof.

6. The method according to claim 1 wherein the central station attributes, in a network setup phase, device specific information comprising a unique identifier to each device belonging to the network and transmits all attributed unique identifiers to each device via a secure transmission link.

7. The method according to claim 1 wherein the additional data comprises a time stamp including current date and time, the device specific information and a digest based on all the device specific information of the devices belonging to the network.

8. The method according to claim 7 wherein the digest is formed by applying a hash function on all or part of the device specific information of the devices belonging to the network, said device specific information being stored in the secure non-volatile memory of each device.

9. The method according to claim 1 wherein the at least one device includes at least one camera monitored by the central station via the network, the at least one camera being configured to produce and transmit a digital video stream to the central station, the method comprising:
receiving a camera specific identifier by the at least one camera, and storing said information into a secure non-volatile memory of the at least one camera;
forming by the at least one camera a data block based on at least the camera specific identifier stored in the secure non-volatile memory;
merging by the at least one camera additional data with the digital data stream produced by said camera, the additional data comprising at least the previously formed data block, obtaining a modified video stream; and
transmitting by the at least one camera the modified digital video stream to the central station.

10. The method according to claim 1, wherein the central station monitors at least one first and second camera via the network, the at least one first and second camera being configured to communicate with each other.

11. The method according to claim 10 further comprising:
providing to the first camera the camera specific identifier of the second camera and providing to the second camera the device specific identifier of the first camera, storing said identifiers into the secure non-volatile memory of each camera;
forming by the first and second camera a data block based on at least the camera specific identifier of the first and second camera stored in the secure non-volatile memory of each camera; and
merging by each camera additional data in form of a watermark with the digital video stream produced by said camera, the watermark comprising at least the specific identifier of the camera and the previously formed data block, obtaining a watermarked digital video stream, transmitting by each camera the watermarked digital video stream to the central station.

12. A camera for producing a digital video data stream in a communication network, the network comprising a central station and at least another camera monitored by the central station via the network, the camera comprising:
a video sensor configured to produce the digital video data stream;
a processor;
a merging module;
a secure non-volatile memory configured to store at least a device specific identifier; and
a communication module configured to communicate to the at least another camera and to the central station and to receive a camera specific identifier of the at least other camera of the network and to store said camera specific identifier into the secure non-volatile memory;
wherein the processor is further configured to retrieve from the secure non-volatile memory the camera specific identifier and the specific identifier of the at least other camera and to form a data block based on at least said identifiers; and
wherein the merging module is configured to merge additional data in a form of a watermark with the produced digital video data stream, the watermark comprising at least the specific identifier of the camera and the previously formed data block, and to obtain a watermarked digital video data stream, and wherein the communication module is further configured to transmit the watermarked digital video data stream to the central station.

13. The camera according to claim 12 wherein the additional data comprises a time stamp including current date and time, a position indicator or coordinates of the camera, the device specific identifier and a digest based on all or part of the identifiers of the cameras belonging to the network.

14. The camera according to claim 12 wherein the watermark further contains authentication data comprising a time code or a sequence number and a corresponding image signature based on a sequence of consecutive video frames extracted from the digital video data produced by the video sensor of the camera, the image signature including a fingerprint of the sequence encrypted by a key known by the central station.

* * * * *